Jan. 14, 1930.   H. E. SIPE   1,743,492
RESILIENT PLUG, DOWEL, AND COUPLING PIN
Filed Aug. 2, 1927
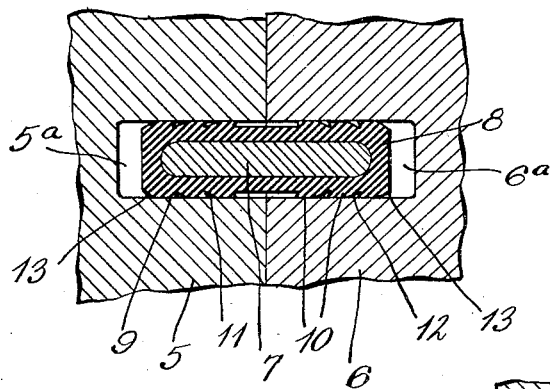
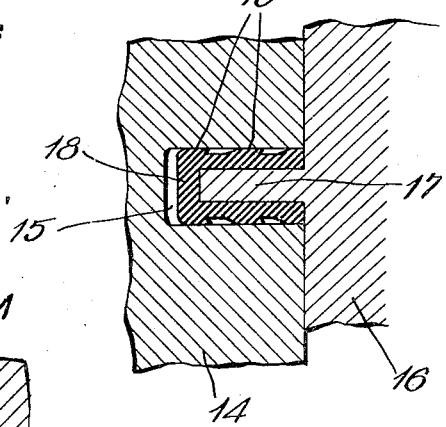
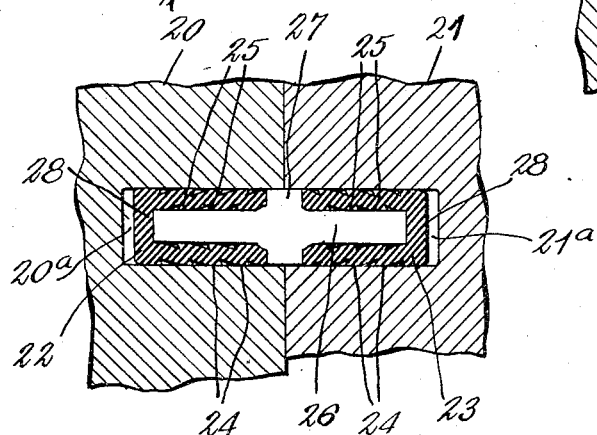
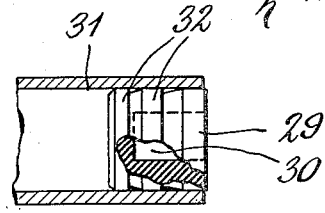
INVENTOR
Harry E. Sipe
BY
ATTORNEY Patented Jan. 14, 1930

1,743,492

UNITED STATES PATENT OFFICE

HARRY E. SIPE, OF NEW YORK, N. Y.

RESILIENT PLUG, DOWEL, AND COUPLING PIN

Application filed August 2, 1927. Serial No. 210,088.

This invention relates to coupling pins, dowels, plugs and like devices and particularly to devices of this class composed of resilient or elastic material; and the object of the invention is to provide a plug body for insertion into a tube, pipe, socket or the like for plugging the open end thereof to provide a seal and closure therefor; a further object being to provide a resilient body in the form of a dowel or alining pin for coupling two or more parts together to retain the same in alinement and yet providing for a slight expansion and contraction of the parts coupled together thereby or to compensate for slight irregularities in the alinement of said parts; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a sectional view of a dowel or a coupling pin which I employ, indicating one method of its use.

Fig. 2 is a view similar to Fig. 1 but showing the invention applied to an alining pin or centering member.

Fig. 3 is a view similar to Fig. 1 but showing my invention applied to a coupling dowel pin having independent resilient bodies; and, Fig. 4 is a side and sectional view of a plug body which I employ, and indicating the method of its use.

In Fig. 1 of the drawing, I have shown two parts or body members 5 and 6 coupled together by a dowel pin comprising a central body 7 of rigid material enclosed in a casing or jacket 8 of resilient or elastic material, such for example as rubber or composition rubber, the coupling pin or dowel pin being of any desired cross sectional form. The casing or jacket 8 thereof is provided around its periphery and at opposite end portions thereof with spaced projecting ribs or fins 9 and 10 between which are grooves 11 and 12. The structure of the ribs 9 and 10 is such as to permit of their flexing toward the center of the coupling pin to permit of the free passage of the pin into the sockets $5^a$ and $6^a$ of the body parts 5 and 6 to be coupled together thereby. But, when the pin is inserted into said sockets, the removal of the pin therefrom is prevented by virtue of the tensional engagement of the ribs 9 and 10 with the walls of the sockets 5 and 6 and the fact that the body of rubber contained in the casing or jacket 8 cannot be compressed to permit of the forcible disengagement of the parts 5 and 6 therefrom, unless sufficient pressure is subjected, to destroy either of said parts or the coupling pin itself. The ends of the casing 8 are beveled as seen at 13 to permit of the free passage into the sockets 5 and 6. It will also be understood that a suitable, cement or adhesive may be employed in connection with the coupling member to adhere the same to the parts 5 and 6 to aid in securing said parts together.

It will be noted that the depth of the sockets $5^a$ and $6^a$ is such as to form a chamber, the dimensions of which are greater than the coupling pin or member 7—8 in order to insure that the adjacent faces of the parts 5 and 6 may be brought together in close proximity or abutting relation. When coupled together, any lateral movement or expansion and contraction of the parts will be taken up and compensated for by the resilient properties of the casing or jacket proper 8 of the pin, it being understood that the pin proper is composed of rubber, the stiffening body 7 being employed merely as a reinforcing member.

In Fig. 2 of the drawing, I have shown a modification, wherein one part 14 is provided with a center 15 and the other part 16 with a projecting pin or dowel member 17 which may be secured to or constitute an integral part of the part 16. In this construction, the parts 14 and 16 are coupled together by a resilient coupling member 18 secured in any desired manner to the pin 17, for example by a suitable cement or adhesive and adapted to be inserted into the socket 15. The periphery of the coupling body 18 is provided with projecting ribs 19 adapted to flex in the direction of the part 16 in the insertion of the coupling 18 into the socket 15. In this construction, it will be apparent that the part 16 will have a resilient and yet positive support and coupling with the part 14 permitting of slight relative movement of said parts. It will be understood that in this construction, the ribs 19 are of greater dimensions or diameter than the diameter of the socket 15, and this is also true of the ribs 9 and 10 in the coupling pins 7 and 8.

In Fig. 3 of the drawing, I have shown another modification wherein two parts 20 and 21 are provided with sockets 20ª and 21ª in which coupling sleeves 22 and 23 are adapted to be mounted, said sleeves being identical to the couplings 18 shown in Fig. 2 of the drawing except, in addition to the projecting rib members 24 on the outer faces of said members, the bores thereof are also provided with projecting rib members 25 adapted to engage a dowel or coupling pin 26 or a reinforcing body which is independent of the couplings 22 and 23 but secured thereto by the ribs 25. The reinforcing body has a central enlarged portion 27 spacing the members 22 and 23 one from the other. With this construction, the entire coupling pin or dowel constitutes the two bodies 22 and 23 and the member 26 of rigid material on which the parts 22 and 23 are mounted. In coupling the bodies 20 and 21 together, the pin structure with its resilient couplings thereon is first driven into one socket 20ª and 21ª and then into the other socket in coupling the butt parts 20 and 21 together. The resilient couplings 22 and 23 close the ends of the rigid pin member 26 as seen at 28. This structure will operate in coupling the body parts together, in the same manner as in the construction shown in Figs. 1 and 2.

In Fig. 4 of the drawing, I have shown a pin or plug body 29 composed of resilient material such as rubber or composition rubber, reinforced and strengthened by a rigid body 30 mounted therein and exposed through the outer end of the plug 29. This construction is adapted primarily for use in closing the end of a tube 31 or the open end of a tubular body of any kind or class, the plug functioning as a cork in this respect, and has many uses; for example in plugging the ends of pipe lines of various kinds and classes, the object being to provide a plug which may be quickly and easily applied in position and securely held in position by the flexible ribs 32 on the periphery thereof which firmly and tensionally engage the bore of the pipe or tube 31 to prevent possible displacement of the plug. In this construction, as well as in the other structures shown, a cement or sealing compound or solution of any kind or class, may be used in conjunction with the plug.

While the rigid bodies are preferred in all of the forms of construction shown, it will be understood that I am not necessarily limited to the use of such rigid reinforcing bodies and the same may or may not be employed; and various other changes in and modifications of the construction herein shown and described may be made within the scope of the appended claims, without departing from the spirit of my invention or sacrificing its advantages.

Having fully described my invention, what I claim as new and desire to secure by Letters Patent, is:

1. A coupling pin of the class described comprising a resilient body for permanently and resiliently coupling two parts together, said pin being insertable into sockets in said parts and provided with circumferentially arranged ribs adapted to flex outwardly with respect to the socket in mounting the pin therein and being placed under compression in engaging the walls of the socket to retain the same against displacement therefrom.

2. A coupling pin of the class described comprising a rigid body, one end portion of said body having a facing of resilient material, and said facing having outwardly projecting ribs spaced longitudinally thereof.

3. A coupling of the class described comprising an elongated pin-like body of resilient material, the end portions of said body having longitudinally spaced ribs inclined toward the center of said body and free to flex toward each other and longitudinally of said body.

4. A coupling of the class described comprising an elongated pin-like body of resilient material, the end portions of said body having longitudinally spaced ribs free to flex toward each other and longitudinally of said body, and a member of rigid material arranged centrally of said body.

5. A coupling pin comprising a body of rubber having irregularities spaced longitudinally thereof, whereby in mounting said pin in connection with a support, said irregularities flex in one direction, and said pin is retained against displacement from said part by the compression of said irregularities thereon.

6. A device of the class described comprising a pin-like body, the opposite end portions of said body having longitudinally spaced circumferential ribs, inclined in the direction of the central portion of said body and adapted to flex toward the center of the body in mounting the same in sockets of two parts to be coupled together thereby.

In testimony that I claim the foregoing as my invention I have signed my name this 22nd day of July, 1927.

HARRY E. SIPE.